United States Patent [19]

Hansen

[11] Patent Number: 4,723,607

[45] Date of Patent: Feb. 9, 1988

[54] TURF AERATING APPARATUS AND AERATION TINE THEREFOR

[75] Inventor: Loren F. Hansen, Lincoln, Nebr.

[73] Assignee: Outboard Marine Corporation, Waukegan, Ill.

[21] Appl. No.: 848,121

[22] Filed: Apr. 4, 1986

[51] Int. Cl.⁴ .............................................. A01B 45/02
[52] U.S. Cl. .................................... 172/22; 172/554; 294/50.7
[58] Field of Search .................. 172/22, 21, 122, 554; 111/89, 90, 91, 99, 7.4, 7.1, 7.2, 7.3, 7; 294/50.7

[56] References Cited

U.S. PATENT DOCUMENTS

| | | | |
|---|---|---|---|
| Re. 30,705 | 8/1981 | Hines | 172/22 |
| 313,476 | 3/1885 | Cummings | 294/50.7 |
| 398,139 | 2/1889 | Eaton | 30/301 |
| 790,910 | 5/1905 | McClintock | 111/7.1 |
| 893,425 | 7/1908 | Bell | 30/316 |
| 958,875 | 5/1910 | Ibson | 30/316 |
| 1,704,986 | 3/1929 | Marcy | 21/172 |
| 2,194,597 | 3/1940 | Johnson | 55/18 |
| 2,222,235 | 11/1940 | Nelson | 111/7.1 |
| 2,302,944 | 11/1942 | Helbig | 111/99 |
| 2,612,725 | 10/1952 | Casey | 47/1 |
| 2,690,145 | 9/1954 | Romain | 111/91 |
| 2,899,231 | 8/1959 | Steiner | 294/50.7 |
| 3,022,833 | 2/1962 | Reaser | 172/19 |
| 3,098,672 | 7/1963 | Husband | 294/50.7 |
| 3,113,534 | 12/1963 | Wessel | 111/89 |
| 3,264,877 | 8/1966 | Boxrud | 73/421 |
| 3,586,109 | 6/1971 | Eversole | 172/22 |
| 3,643,746 | 2/1972 | Dedoes | 172/445 |
| 3,834,464 | 9/1974 | Carlson et al. | 172/22 |
| 4,178,860 | 12/1979 | Hines | 111/7 |
| 4,212,357 | 7/1980 | Clements et al. | 172/22 |
| 4,637,328 | 1/1987 | Topham | 111/89 |

Primary Examiner—Richard J. Johnson
Attorney, Agent, or Firm—Welsh & Katz, Ltd.

[57] ABSTRACT

A turf or soil aerating apparatus includes in one embodiment a carrier drum having a plurality of turf aerating tines pivotally supported thereon such that movement of the drum along a turf surface establishes a pattern of aerification holes in the turf. In one embodiment, a tubular coring tine is provided having a generally cylindrical elongated shank portion, a sharpened penetrating end and a bulb portion proximate the penetrating end, the bulb portion having an outer diameter greater than the diameter of the shank portion so as to substantially eliminate friction drag on the shank portion during turf penetration. The inner surface of the shank is sized to facilitate easy passage of turf plugs through the tine. In an alternative tine embodiment, a solid shatter core aerification tine is provided which includes a solid body having an elongated cylindrical shank portion terminating in a generally spherical shaped bulb portion defining a penetrating end of larger diameter than the shank portion so as to substantially eliminate friction drag on the shank portion during penetration into the turf or soil. The tubular coring tines and shatter core aerification tines may also be carried by turf aerating apparatus operative to effect substantially vertical reciprocating movement of the tines during aerification.

17 Claims, 6 Drawing Figures

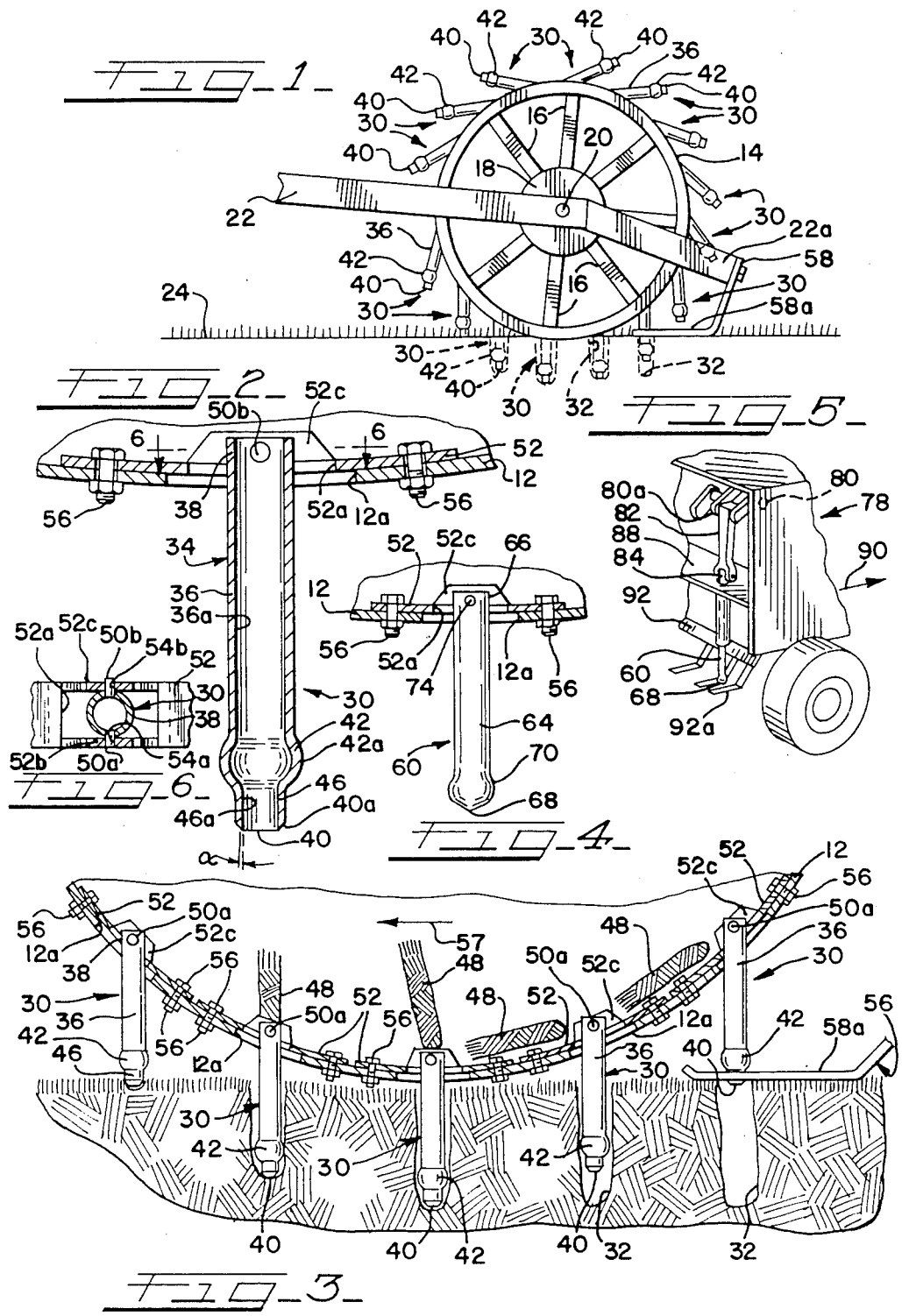

TURF AERATING APPARATUS AND AERATION TINE THEREFOR

BACKGROUND OF THE INVENTION

The present invention relates generally to turf aerating apparatus, and more particularly to novel tines for use with turf or soil aerating apparatus and which reduce the force required to effect turf penetration through substantial reduction in the frictional drag acting on the tines.

It is a common practice in the treatment of certain soil based turf to aerate the turf so as to stimulate root growth and generally effect a dense heartier turf. Such aeration is conventionally accomplished through passing either slicing tines or coring tines over the turf surface. The use of slicing tines results in relatively deep blade type slice cuts being made in the soil, while the use of coring tines results in the removal of generally cylindrical shaped plugs or cores of turf and soil from the ground leaving relatively small holes. Both techniques lead to aeration of the turf and admission of moisture to stimulate root growth.

In the use of coring tines to remove turf plugs or cores up to approximately 1½ inches in length, it is conventional to mount a plurality of coring tines generally radially on a cylindrical shaped wheel or drum which may be caused to roll over the turf surface while supported for rotation about a generally horizontal axis such that the tines penetrate the turf. The tine support drum may be drawn by a tractor or other vehicle so as to facilitate movement across the turf surface to effect the desired aeration. See, for example, U.S. Pat. No. 3,022,833 to Reaser; U.S. Pat. No. 3,643,746 to Dedoes; and U.S. Pat. No. Re30,705 to Hines. U.S. Pat. No. 3,264,877 to Boxrud discloses a somewhat similar apparatus employing generally radial tines or probes to effect soil sampling. Where coring tine penetration of greater than approximately 1½ inches is desired, aerating machines are generally employed in which a plurality of tines are caused to undergo substantially vertical reciprocating movement during turf penetration. See, for example, U.S. Pat. No. 3,834,464. Turf plugs may also be selectively removed from a soil surface by manual devices operative to remove single plugs or cores through manual manipulation. See, for example, U.S. Pat. No. 2,194,597 to Johnson, U.S. Pat. No. 2,899,231 to Steiner, and U.S. Pat. No. 3,098,672 to Husband. Still further, turf and soil aeration may also be accomplished by solid tines which are caused to penetrate the turf so as to effect shatter core aerification.

While the aforementioned turf aerating apparatus and techniques may provide generally satisfactory results, the prior turf aerating apparatus of both the rotary drum and vertical reciprocating tine type are limited in the number of tines which may be employed due to the force required to effect penetration of the associated tines into the turf. This limitation on the number of tines which may be employed on a given machine follows from the fact that the force required to effect penetration of a tine is determined in part by the frictional drag acting on the body of the tine. It thus follows that a tine which minimizes the frictional drag acting on the body of the tine will result in a reduction in the penetration force required to effect the desired depth penetration, thereby allowing a greater number of tines to be employed on a given machine and enabling a closer pattern of aeration holes to be provided in the turf or soil surface.

SUMMARY OF THE INVENTION

One of the primary objects of the present invention is to provide a novel tine for use in aerating turf and the like and which substantially reduces the force required to effect penetration into the turf through reduction in the frictional drag acting on the tine.

A more particular object of the present invention is to provide a novel tine for use in turf aeration wherein the tine includes a generally cylindrical shank having a turf or soil penetrating end, and has a bulb shaped portion proximate the penetrating end defining an outer configuration sized to substantially eliminate frictional drag acting on the shank portion of the tine during turf or soil penetration.

Another object of the present invention is to provide, in one embodiment, a novel coring tine having a generally tubular body defining a cylindrical shank portion, a sharpened annular turf penetrating end, and a bulb shaped portion spaced longitudinally from the penetrating end and having an outwardly convex annular surface of greater diameter than the diameter of the shank portion which, in turn, has an internal diameter greater than the internal diameter of the annular penetrating end so as to substantially reduce frictional drag acting on the tine during turf penetration while facilitating movement of a turf or soil core therethrough.

Still another object of the present invention is to provide, in another embodiment, a novel tine for effecting shatter core aerification of turf, the tine having a solid substantially cylindrical shank portion and a generally spherical shaped turf penetrating bulb end of a diameter greater than the shank portion such that substantially reduced frictional drag acts on the tine during turf penetration.

In carrying out one embodiment of the present invention, a plurality of tubular coring tines are pivotally mounted on a generally cylindrical hollow carrier drum or wheel such that plug or core discharge ends of the tines extend slightly into the carrier drum. Each coring tine has a generally cylindrical tubular shank portion and terminates at its outer end in an internally tapered sharpened penetrating end. A convex bulb shaped element is formed proximate but spaced from the penetrating end of each tine and has an external diameter greater than the diameter of the corresponding shank portion so as to reduce friction drag on the upper shank portion of the tine, thereby reducing the force required to effect desired turf penetration and enabling closer placment of the tines on the carrier drum with resultant denser coring patterns being made possible.

In accordance with another and preferred embodiment of the invention, a plurality of either tubular coring or solid shatter core aerification tines are mounted for substantially vertical reciprocating movement such that enlarged diameter bulb-like portions of the tines are caused to penetrate the turf and substantially eliminate frictional drag acting on corresponding shank portions of the tines. In both embodiments, turf guard or retainer members are positioned to prevent turf peripherally of the tines from being pulled out upon withdrawal of the tines.

Further objects and advantages of the invention, together with the organization and manner of operation thereof, will become apparent from the following detailed description of the invention when taken in conjunction with the accompanying drawings.

BRIEF DESCRIPTION OF THE DRAWINGS

FIG. 1 is a side elevational view of an aerator apparatus carrying turf aerating tines in accordance with one embodiment of the invention;

FIG. 2 is a fragmentary longitudinal sectional view illustrating an aeration tine as employed in the apparatus of FIG. 1;

FIG. 3 is a fragmentary section view illustrating various portions of the aeration tines during turf penetration and withdrawal as the apparatus of FIG. 1 is moved along a ground surface;

FIG. 4 is an elevational view of an alternative turf aeration tine in accordance with the present invention for effecting shatter core aerification;

FIG. 5 is a fragmentary perspective view illustrating an aerator apparatus for effecting generally vertical reciprocation of either tubular coring tines or shatter core aerification tines; and FIG. 6 is a fragmentary sectional view taken substantially along line 6—6 of FIG. 2, but on a reduced scale.

DESCRIPTION OF PREFERRED EMBODIMENTS

Referring now to the drawing, and in particular to FIG. 1, a turf or soil aerating apparatus embodying aeration tines constructed in accordance with one embodiment of the present invention is indicated generally at 10. In the illustrated embodiment, the turf aerating apparatus 10 includes a hollow generally cylindrical carrier drum 12 having a cylindrical outer peripheral surface 14 and a plurality of radial spokes 16 the inner ends of which are affixed to a central hub 18 through which an axle 20 extends to define the longitudinal rotational axis of the drum. The opposite ends of the axle 20 are rotatable within a pair of spaced parallel frame arms, one of which is indicated at 22, which have their forward ends adapted for connection to a suitable hitch or the like on a towing vehicle, such as a tractor or the like (not shown). In this manner, the aerating apparatus 10 may be caused to roll along a turf or soil surface, as indicated at 24.

In accordance with the embodiment of FIG. 1, the drum 12 has a plurality of substantially identical aeration tines in the form of tubular coring tines 30 pivotally mounted or carried thereon such that the tines extend outwardly from the outer peripheral surface 14 of the drum and are positioned in predetermined spaced relation about and along the length of the drum. Each of the coring tines 30 is adapted to remove a plug or core of turf or soil from the surface 24, thereby leaving a predetermined pattern of aeration holes, such as indicated at 32 in FIG. 3, as the aerating apparatus traverses the ground.

Referring particularly to FIGS. 2 and 3, each coring tine 30 includes a tubular metallic body 34 having an elongated substantially cylindrical shank portion 36, a support end 38 and a turf or soil penetrating end 40. The shank portion 36 is of uniform transverse cross section throughout its longitudinal length and extends from the support end 38 to an outwardly convexly shaped bulb 42 formed proximate the penetrating end 40. The bulb 42 is preferably symmetrical about the longitudinal axis of the tine and has an outer surface 42a formed as a segment of a sphere having an outer diameter greater than the diameter of the shank portion 36. In one embodiment, the outer diameter of the bulb portion 42 is preferably made approximately 0.062–0.093 inch larger than the outer diameter of the cylindrical shank portion 36.

The bulb shaped portion 42 of the coring tine 30 is spaced longitudinally from the penetrating end 40 so as to define a tubular wear length 46 between the penetrating end and the bulb, the wear length being selected to achieve desired wear life of the coring tine. A wear length of appoximately $\frac{1}{4}$ to $\frac{1}{2}$ inch is recommended. The wear length 46 of the coring tine 30 terminates at its free end in the turf penetrating end 40 which preferably is beveled or chamfered at 40a to provide a sharpened annular turf or soil penetrating cutting edge. The inner surface 46a of the wear length 46 is tapered so as to increase in diameter in the direction away from the cutting edge 40, such internal taper preferably having a taper angle of approximately 1° relative to the longitudinal axis of the tine, as represented by the Greek symbol for alpha in FIG. 2.

The internal diameter of the sharpened penetrating end 40 and associated wear length 46 of tine 30 is smaller than the diameter of the inner cylindrical surface 36a of the shank portion 36 such that a turf or soil plug or core, such as indicated at 48 in FIG. 3, formed by penetration of a tine may readily pass upwardly through the tine with minimal frictional resistance or drag being applied to the plug or core by the internal surfaces of the internally tapered penetrating end and the shank portion 36.

To facilitate pivotal mounting of the coring tines 30 on the cylindrical drum 12, each of the coring tines has a pair of axially aligned diametrically opposed stub shafts or pivot pins 50a and 50b suitably affixed to its upper mounting end 38, as by welding or the like, such that the axis of the pivot pins intersects the axis of the tine in normal relation. As illustrated in FIGS. 2, 3 and 6, the upper end of each tine shank portion 36 is received through a rectangular opening 52a in a mounting bracket 52, and the corresponding pivot pins 50a, b are received through suitable openings 54a and 54b, respectively, formed in upstanding walls 52b, c of the mounting bracket so as to enable pivotal movement of the tine relative to its mounting bracket. Each mounting bracket 52 is adapted to be affixed against the inner surface of the carrier drum 12, as by screws 56, such that its rectangular opening 52a overlies a rectangular opening 12a formed in the annular carrier drum wall and the corresponding coring tine 30 extends outwardly through the opening 12a. The rectangular openings 12a and 52a in the carrier drum 12 and mounting brackets 52 are made of sufficient length and width to allow the corresponding coring tines to freely pivot about their pivot axis through angles of approximately 70° in either direction from a position wherein the tine is substantially radial to the axis of rotation of the carrier drum, or through a full angular movement of approximately 140°. The angular pivotal movement which the tines 30 may undergo may be varied as desired by selection of the size of the openings 12a in the circumferential direction. Conventionally, the aerating tines are mounted on the drum in parallel rows extending longitudinally of the drum.

In the operation of the aerating apparatus 10, and with particular reference to FIG. 3, as the cylindrical drum 12 of the aerating apparatus is caused to traverse the ground or turf surface 24 in the direction of the arrow 58, the drum undergoes rotation relative to its rotational axis 20 in a counterclockwise direction as viewed in FIG. 3. As each successive coring tine 30 reaches a position where its penetrating end 40 initially engages the surface 24 in substantially normal relation thereto, further movement of the drum causes the sharpened cutting edge to cut through the surface turf or grass and penetrate the subsoil during which the tine stays substantially vertical. The coring tines reach maximum depth penetration when the rotational axis 20 of the drum passes over the penetrating tines, and cause a generally cylindrical turf plug or core 48 to be formed within each tine. As aforementioned, the internal diameter of the sharpened end 40 of each tine 30 is smaller than the diameter of the inner surface 36a of the shank portion 36 such that each internally formed plug or core 48 readily passes upwardly through the tine with minimal frictional engagement with the inner shank surface 36a, thus substantially eliminating frictional drag between the core plug and the inner surface of the coring tine. After reaching full penetration, further movement of the drum 12 causes the coring tines to be progressively withdrawn from the turf and underlying subsoil while maintaining a generally vertical orientation. As each successive tine is withdrawn from the turf and continues in its upward circular path, the tine pivots about its pivot axis in a flopping action as the tine passes overcenter at the top of its arcuate path. This action will generally cause the earthen plug within the tine to drop by gravity from the tine into the drum. If a turf or soil core does not drop from a tine, it will be forced outwardly from the inner end of the tine as the tine undergoes its next turf penetrating cycle. In the illustrated embodiment, the ends of the drum 12 are open so that the earthen plugs or cores may fall out of the cylindrical drum onto the turf where they may be broken up by the weather or an object traversing the aerated area.

As illustrated in FIG. 3, as each successive coring tine 30 is caused to penetrate the turf and underlying subsoil, the associated bulb portion 42 expands the wall of the generally cylindrical hole formed by the sharpened penetrating end 40 of the tine to a diameter greater than the diameter of the shank portion 36 of the corresponding tine. This action serves to substantially eliminate frictional drag on the outer surface of the tine shank with the result that the force required to effect penetration of the coring tine is substantially reduced. Such reduction in frictional drag acting on the coring tines also reduces wear on the tines and allows closer placement of tines on the carrier drum so as to achieve closer or denser coring patterns in the turf than have heretofore been possible for a given downward available penetration force acting on the tines.

Means in the form of a turf guard or restraining member, indicated generally at 58 in FIGS. 1 and 3, is preferably carried by the frame members 22 so as to restrain and prevent the turf from being pulled upwardly adjacent each aeration tine 30 as it is withdrawn from the turf. In the illustrated embodiment, the frame members 22 have rearward extensions, one of which is indicated at 22a, to which a transverse guard member 59 is affixed. The guard member 59 has a plurality of depending turf engaging fingers 59a which enable movement of the coring tines 30 therebetween but which prevent the turf adjacent a withdrawing tine from being pulled upwardly.

FIG. 4 illustrates an alternative aeration tine, indicated generally at 60, constructed in accordance with an alternative embodiment of the invention. The aeration tine 60 is particularly adapted for what is generally termed "shatter core aerification". To this end, the aeration or shatter core aerification tine 60 includes a solid body, preferably made from a suitable metallic material, having an elongated substantially cylindrical shank portion 64, a mounting or support end 66 and an opposite pointed soil penetrating end 68. The tine body 60 has a solid bulb portion 70 which is formed at the soil penetrating end 68 of the tine and has a substantially spherical configuration, the lowermost area of which has the pointed end 68 formed thereon to define the soil penetrating end of the tine. The bulb portion 70 is formed integral with the elongated shank portion 64 and has an outer diameter greater than the diameter of the cylindrical shank portion 64. The diameter of the bulb portion 70 is preferably approximately 0.062–0.093 inch greater than the diameter of the cylindrical shank portion 64.

The shatter core aerification tine 60 is adapted to be pivotally mounted on a cylindrical carrier drum or wheel, such as the drum 12, in similar fashion to the aforedescribed coring tines 30 such that a plurality of the shatter aerification tines extend outwardly from the carrier drum in a predetermined pattern, generally straight rows spaced circumferentially about the drum. To this end, each of the tines 60 has a transverse pivot pin 74 extending therethrough such that diametrically opposite outwardly extending ends of the pivot pin are received through apertures in legs 52b, c of a mounting bracket 52, thus enabling mounting of a plurality of tines 60 at selected positions on the carrier drum corresponding to openings 12a formed in the carrier drum. In this manner, a desired shatter core aerification pattern may be obtained as the drum traverses a turf or soil surface.

In operation, as a carrier drum or wheel 12 having aerification tines 60 pivotally mounted thereon is caused to traverse a turf surface, the aerification tines approach the turf 24 in a generally vertical orientation. As the bulb portion 70 of each tine 60 penetrates the turf 24, it compacts or shatters the surface turf and underlying soil to create a generally cylindrical shaped aerating hole within the turf and soil, such as the aforedescribed holes 32. Because the bulb portion 70 of each tine 60 has a larger diameter than the corresponding shank portion 64, and because the tine remains in generally vertical orientations throughout turf penetration and withdrawal, the side wall of the formed hole engages the shank portion of the tine only minimally, if at all, thereby substantially eliminating frictional drag on the shank of the tine and reducing the force required to effect full penetration of the shatter aerification tine.

FIG. 5 illustrates a fragmentary portion of an alternative apparatus, indicated generally at 78, for use with tubular coring tines similar to the aforedescribed coring tines 30 or with solid shatter core aerification tines similar to the tines 60 to effect substantially vertical reciprocating movement of the shatter core tines during turf aerification. The apparatus 78 is preferred over the rotary drum or wheel type carrier 12, particularly when tine penetration of greater than 1½ inches is desired. Apparatus 78 is of generally known construction and is disclosed more fully in the aforementioned U.S. Pat. No. 3,834,464 which is incorporated herein by reference. The apparatus 78 includes a selectively rotatable horizontal crank shaft 80 having a plurality of eccentric crank arms, one of which is shown at 80a, to which connecting rods 82 are pivotally connected. A push rod 84 is pivotally connected to each connecting rod 82 and extends downwardly through a vertically disposed guide sleeve 86 which may be affixed to a transverse horizontal plate 88 of the apparatus 78. Each push rod 84 is adapted to have a tubular coring tine or a shatter core aerification tine axially affixed thereon for vertical reciprocating movement such that the lower penetrating end of the tine is caused to penetrate the turf and effect removal of a turf plug or shatter aerification as the crank shaft rotates during movement of the apparatus along a turf surface in the direction of arrow 90. It will be appreciated that both the tubular coring tines and solid shatter core tines are affixed in nonpivotal relation to associated push rods 84, and that when utilizing tubular coring tines with the apparatus 78, each tine must be supported in a manner to enable discharge of turf plugs from its upper end during aerification. A turf guard or restrainer 92 is carried by the apparatus 78 and includes a plurality of depending parallel arms 92a which extend adjacent each tine so as to prevent turf from being pulled upwardly adjacent the aerification tines during withdrawal from the turf.

Thus, in accordance with the present invention, various embodiments of turf or soil aerification tines are provided which substantially eliminate the frictional drag acting on the tines during turf penetration, with the result that wear is significantly reduced while enabling a greater number of tines to be mounted within a given area on the associated apparatus to effect a greater aerification hole density for a given available penetrating force.

While preferred embodiments of the present invention have been illustrated and described, it will be understood that changes and modifications may be made therein without departing from the invention in its broader aspects. Various features of the invention are defined in the following claims.

What is claimed is:

1. A coring tine for use in aerating turf and the like comprising a tubular body having an elongated substantially cylindrical shank portion, said tubular body having a turf penetrating end defined by an annular cutting edge and hving a support end opposite said penetrating end, said body defining a bulb portion spaced longitudinally from said penetrating end and having an outer convexly shaped annular surface of greater diameter than the outer diameter of said shank portion such that upon penetration of said bulb and shank portion into a turf surface, frictional drag on said shank is substantially eliminated.

2. A coring tine as defined in claim 1 including diametrically opposed pivot pins affixed to said body adjacent said support end thereof so as to facilitate pivotal mounting of the coring tine on a carrier member such that the tine extends outwardly from an outer peripheral surface of said carrier member.

3. A coring tine as defined in claim 1 wherein said bulb portion is formed as a segment of a sphere.

4. A coring tine as defined in claim 3 wherein said tubular body has an internal taper adjacent said penetrating end thereof, said interal taper increasing in diameter in the direction away from said cutting edge.

5. A coring tine as defined in claim 4 wherein said tubular body is defined by an annular wall of generally uniform thickness and having an internal diameter greater than the largest internal diameter of said internally tapered penetrating end.

6. A coring tine as defined in claim 4 wherein said internal taper is formed at a tapered angle of approximately 1° relative to the longitudinal axis of the coring tine.

7. In a turf aerating machine including a cylindrical drum supported for rotation about a substantially horizontal axis and having an outer generally cylindrical surface defining a plurality of apertures communicating with an internal chamber in said drum, the combination therewith comprising a plurality of coring tines mounted on said drum and extending outwardly therefrom each in alignment with a selected aperture in said cylindrical surface, each of said coring tines including a tubular body having an elongated substantially cylindrical shank portion, and a distal turf penetrating end defined by an annular sharpened cutting edge, said body defining a bulb portion spaced longitudinally from said turf penetrating end and having an outer convexly shaped annular surface of greater outer dimension than the outer diameter of said cylindrical shank portion such that upon movement of the turf aerating machine along a turf or soil surface, the penetrating ends of said coring tines and the associated bulb portions are caused to penetrate the turf with said bulb portions being operative to substantially eliminate frictional drag on the shank portions of said tines during penetration.

8. An aerating machine as defined in claim 7 wherein said bulb portion of each tine is formed as a segment of a sphere.

9. An aerating machine as defined in claim 8 wherein each tubular body has an internal taper adjacent its penetrating end, said internal taper increasing in diameter in the direction away from said cutting edge.

10. An aerating machine as defined in claim 9 wherein the shank portion of each tubular body has an internal diameter greater than the internal diameter of its penetrating end.

11. An aerating machine as defined in claim 7 wherein each of said tines is pivotally mounted on said drum so as to penetrate the turf when disposed in a generally vertical orientation.

12. An aerating machine as defined in claim 7 including means restraining lifting of turf adjacent said tines during withdrawal from the turf.

13. In a turf aerating apparatus including at least one aerating tine and means supporting said tine for generally vertical longitudinal reciprocating movement upon movement of the apparatus along a turf surface; the improvement whrein said tine comprises a tubular body including an elongated substantially cylindrical shank portion having a turf penetrating end defined by an annular sharpened cutting edge, said body having a substantially spherical bulb portion spaced longitudinally from said cutting edge and having an outer convexly shaped surface of greater diameter than the outer diameter of said shank portion such that frictional drag on said shank portion is substantially eliminated during downward penetration of said tine into the turf during aerification.

14. An aerating apparatus as defined in claim 13 wherein said bulb portion is formed as a segment of a sphere.

15. An aerating apparatus as defined in claim 14 wherein said tubular body has an internal taper adjacent is penetrating end, said internal taper increasing in diameter in the direction away from said cutting edge.

16. An aerating apparatus as defined in claim 15 wherein the shank portion of each tubular body has an internal diameter greater than the internal diameter of its penetrating end.

17. An aerating apparatus as defined in claim 13 including means restraining lifting of turf adjacent said tine during withdrawl from the turf.

* * * * *